United States Patent [19]

Okashiro et al.

[11] Patent Number: 4,748,356

[45] Date of Patent: May 31, 1988

[54] ELECTRIC FUEL PUMP

[75] Inventors: Tetsuo Okashiro; Shingo Iwai; Ryozo Suzuki, all of Hiroshima, Japan

[73] Assignee: Mitsubishi Denki Kabushiki Kaisha, Tokyo, Japan

[21] Appl. No.: 11,433

[22] Filed: Jan. 29, 1987

[30] Foreign Application Priority Data

Jan. 30, 1986 [JP] Japan .............................. 61-13440[U]

[51] Int. Cl.$^4$ ............................................ H02K 13/00
[52] U.S. Cl. ......................................... 310/72; 310/43
[58] Field of Search .................. 310/72, 68 R, 43, 87, 310/239, 68 C, 68 D

[56] References Cited

U.S. PATENT DOCUMENTS

| 3,048,722 | 8/1962 | Baron ..................................... 310/72 |
| 3,418,991 | 12/1967 | Shultz et al. . |
| 3,754,844 | 8/1973 | Nusser et al. ..................... 310/43 X |
| 4,342,934 | 8/1982 | Van Wijhe et al. ............... 310/72 X |
| 4,550,268 | 10/1985 | Becker et al. ..................... 310/72 X |

FOREIGN PATENT DOCUMENTS

| 1095451 | 4/1964 | United Kingdom . |
| 1329297 | 9/1973 | United Kingdom . |
| 2018044 | 3/1979 | United Kingdom . |
| 2024530 | 5/1979 | United Kingdom . |
| 2049302 | 3/1980 | United Kingdom . |

Primary Examiner—Donovan F. Duggan
Attorney, Agent, or Firm—Lowe, Price, LeBlanc, Becker & Shur

[57] ABSTRACT

An electric fuel pump is provided with an insulative holding member 20 for holding choke coils 16 and connecting portions 23 between the choke coils and lead wires (14) as well as between the choke coils and brushes 10, to be mounted in the interior of a pump frame 1. In this electric fuel pump, the insulative holding member 20 holds and fixes the choke coils 16 and the connecting portions around the same, thereby to protect the choke coils 16 and the nearby connecting portions against vibration and shocks applied to the fuel pump. The holding member 20 also insulates conductive parts so that the same are not in contact with a housing 1 of magnetic material or the like, thereby to improve insulativity.

9 Claims, 2 Drawing Sheets

ELECTRIC FUEL PUMP

BACKGROUND OF THE INVENTION

1. Field of the Invention

The present invention relates to an electric fuel pump for an automobile or the like, and more particularly, to an electric fuel pump with improved mounting structure of choke coils required for suppressing noise to a radio or a stereo assembled in the automobile.

2. Description of the Prior Art

FIG. 4 is a sectional view of a conventional electric fuel pump including choke coils for noise suppression, and FIG. 5 is a sectional plan view taken along the line V—V in FIG. 4. In FIGS. 4 and 5, 1 a cylindrical motor housing 1 of magnetic material also serves as a pump housing, and a cover 2 is fixed to the upper end of the housing. The cover 2 to retains a motor 3 in the housing and defines a fuel outlet port 4. A bracket 5 defining a pump chamber and a pump cover 6 including a fuel suction port 13 are engaged with the lower edge of the motor housing 1. Interposed between the bracket 5 and the pump cover 6 is an impeller 8 fixed for co-rotation to a shaft 7 of the motor 3. A commutator 9 is mounted on the motor shaft 7, and a pair of brushes 10 are pressure-welded to the side surface of the commutator 9 symmetric to the central axis of rotation thereof. The brushes 10 are held by brush holders 11 respectively, and connected with pigtails 12 for supplying power.

Lead wires 14 for power supply extend into the motor housing 1 through the cover 2, such that the forward ends thereof are connected with terminal boards 15 fixed on the bracket 5 respectively. Between the terminal boards 15 and the pigtails 12, choke coils 16 are respectively connected to eliminate electrical noise generated by rectification. In further detail, upwardly extending projections 17a and 17b are provided on the bracket 5 to respectively hold the choke coils 16, whose one-side ends are connected to the forward ends of the lead wires 14 respectively on the terminal boards 15 while the other ends are connected to the pigtails 12 on L-shaped bent portions 18 of the brush holders 11 respectively, to define electrical paths.

By external power supplied to the lead wires 14, the commutator 9 is supplied with power through the choke coils 16 and the brushes 10, whereby the shaft 7 of the motor 3 is rotated, resulting in rotation of the impeller 8 fixed to the shaft 7. Thus, fuel (liquid) is sucked through the suction port 13 provided on the pump cover 6 and passes through the housing interior defined by the motor housing 1, the cover 2 and the pump cover 6 to be discharged from the outlet port 4 formed in the cover 2.

In the aforementioned conventional electric fuel pump, the structure for holding the choke coils 16 and the forward ends of the lead wires 14 is relatively weak. Consequently, the choke coils 16 may be displaced or disconnected from the forward ends of the lead wires 14 by vibration or shock applied to the fuel pump.

Further, since conductive parts such as the forward ends of the lead wires 14, ends of the choke coils 16 and the terminal boards 15 are exposed, the same may be in contact with the motor housing 1 of magnetic material. Thus, improvement in insulativity is required.

In addition, assembly is difficult since the other ends of the choke coils 16 must be connected with the pigtails 12 after fixing the terminal boards 15 on the bracket 5 and mounting the choke coils 16.

SUMMARY OF THE INVENTION

Accordingly, the present invention has been proposed to solve the aforementioned problems, and the object thereof is to provide an electric fuel pump provided with a holding member to hold the choke coils to prevent displacement by vibration or the like and, thereby improve reliability in operation and ease of assembly.

The electric fuel pump according to the present invention comprises an insulative holding member for holding choke coils and connecting portions between the choke coils and lead wires as well as between the choke coils and brushes to be mounted in the interior of a pump frame.

According to the electric fuel pump of the present invention, an insulative holding member is employed to hold and fix the choke coils and connecting portions around the same, thereby to protect the choke coils and the nearby connecting portions against vibration, shocks and the like applied to the fuel pump.

Thus, the choke coils and the connecting portions relating thereto are improved in vibration resistance and shock resistance, thereby to obtain a highly reliable electric fuel pump which can prevent disconnection of electrical paths.

Further, conductive parts such as the connecting portions are improved in insulativity, thereby to improve reliability.

In addition, assembly workability of the electric fuel pump can be improved according to the present invention.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
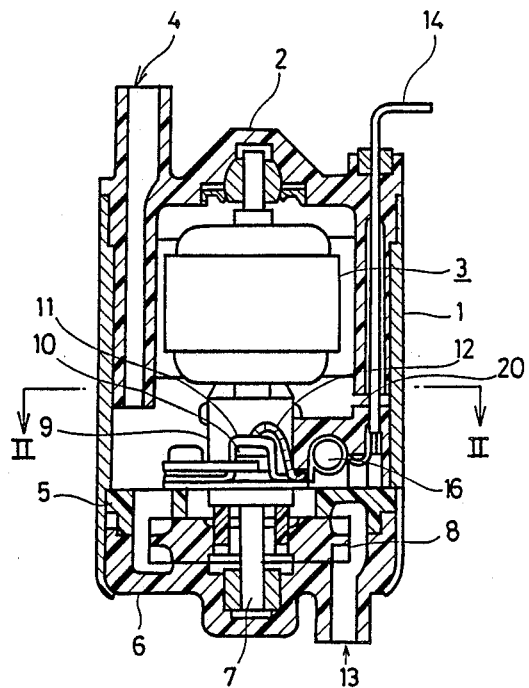
FIG. 1 is a front sectional view showing an embodiment of the present invention.
Figure 2:
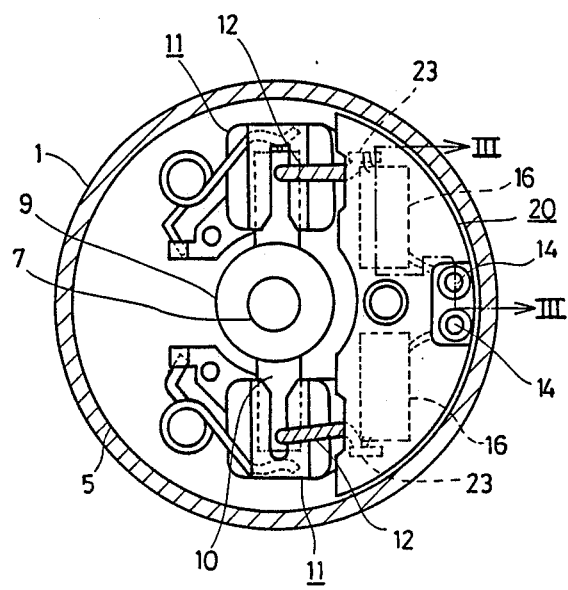
FIG. 2 is a plan sectional view taken along the line II—II in FIG. 1.
Figure 3:
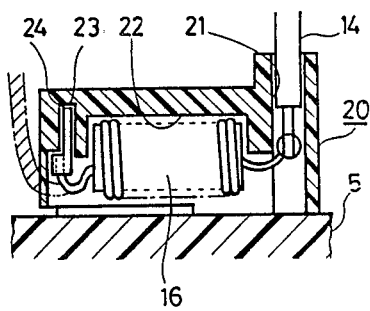
FIG. 3 is a side sectional view taken along the lines III—III in FIG. 2.
Figure 4:
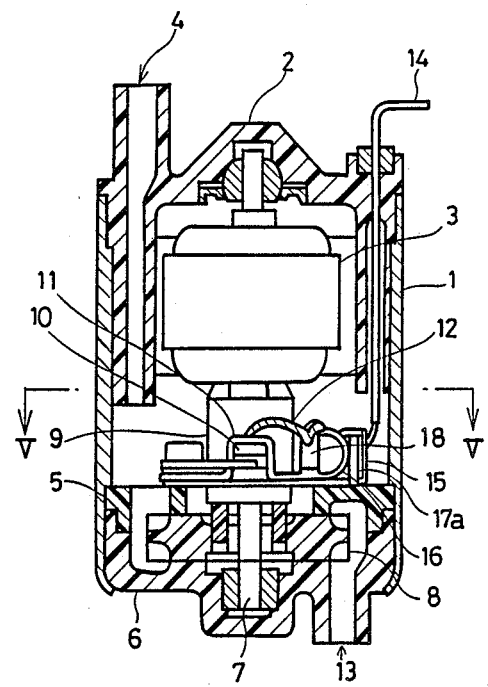
FIG. 4 is a front sectional view showing a conventional electric fuel pump.
Figure 5:
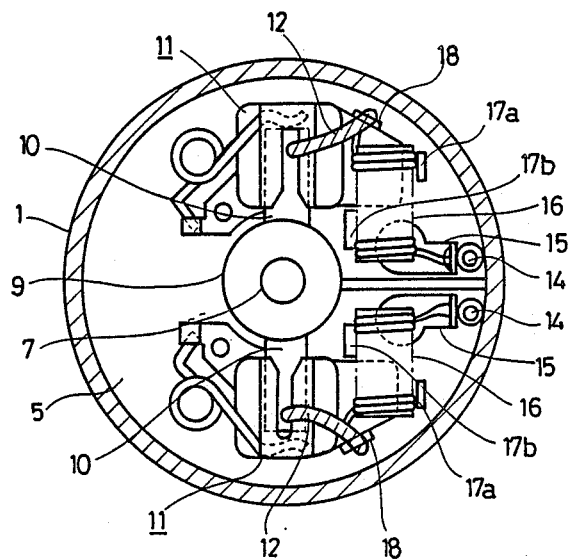
FIG. 5 is a plan sectional view taken along the line V—V in FIG. 4.

Referring to FIGS. 1 to 3, cylindrical motor housing 1 of magnetic material, also a pump housing, includes a cover 2 fixed to the upper end of the same. The cover 2 retains motor 3 in the housing and defines a fuel outlet port 4. A bracket 5 defines a pump chamber and a pump cover 6 engaging housing 1 includes a fuel suction port 13 the. Interposed between the bracket 5 and the pump cover 6 is an impeller 8 which is fixed to motor shaft 7 for rotation. A commutator 9 is mounted on the motor shaft 7, and a pair of brushes 10 are pressure-welded to the side surface of the commutator 9 symmetric to the central axis of rotation thereof. The brushes 10 are held by brush holders 11 respectively, and connected with pigtails 12 for supplying power.

The feature of the invention resides in provision of a coil holder 20. Coil holder 20 is a vessel of insulating material having a lower opening surface, and provided with through-holes 21 for receiving the forward ends of the lead wires 14 and cavities 22 and 24 for embedding choke coils 16 and link terminal boards 23 respectively.

The lead wires 14 are press-fitted in the through-holes 21 respectively, so that the forward ends thereof are respectively connected with one-side ends of the choke coils 16 embedded in the cavities 22. The coil holder 20 may be provided with cavities for embedding such connecting portions. The other ends of the choke coils 16 are connected with the forward ends of the pigtails 12, respectively, through the link terminal boards 23 which are press-fitted in and fixed to the cavities 24. The opening surface of the coil holder 20 is oppositely fixed to the upper surface of the bracket 5, so that none of the choke coils 16 and respective connecting portions are exposed.

Even if external vibration or shock is applied to the fuel pump, substantially no displacement or disconnection is caused in the choke coils 16 and the connecting portions between the one-side ends of the choke coils 16 and the lead wires 14 as well as between the other ends of the choke coils 16 and the pigtails 12 by virtue of the aforementioned holding structure. Thus, the electric fuel pump according to the present invention is improved in vibration resistance and shock resistance.

Further, since the conductive parts are covered by the coil holder 20 of insulating material, the same are not in contact with the motor housing 1 and nearby conductive parts such as the commutator 9.

The coil holder 20 may be fixed on the bracket 5 after completely connecting the one-side ends of the choke coils 16 with the forward ends of the lead wires 14 and the other ends thereof with the forward ends of the pigtails 12, whereby ease of assembly is improved.

Although the other ends of the choke coils 16 are connected with the forward ends of the pigtails 12 by the link terminal boards 23 which are embedded in the cavities 24 of the coil holder 20 in the aforementioned embodiment, the link terminal boards 23 may be omitted to directly connect the other ends of the choke coils 16 with the forward ends of the pigtails 12, with the connecting portions being embedded in the cavities 24 of the coil holder 20.

Further, the one-side ends of the choke coils 16 may be connected with the forward ends of the lead wires 14 by link terminal boards, which are embedded in the coil holder 20.

Although a single coil holder 20 is adapted to hold the pairs of choke coils, lead wires 14 and pigtails 12 in the aforementioned embodiment, two coil holders may be employed to hold these elements.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electric fuel pump comprising a motor housing of conductive material; a motor in the housing; a bracket of insulating material; and a pump cover defining a pump chamber in the housing, said pump cover including a fuel suction port and said motor housing having a fuel outlet port; an impeller mounted on a motor shaft of the motor; a commutator and brush means thereon mounted on the motor shaft; a choke coil; pigtail means connecting the brushes to one end of the choke coil; lead wire means extending into the housing for connection to the other end of the choke coil; and a holding part formed of insulating material mounted to the bracket and including a first cavity receiving the choke coil, a second cavity and a third cavity respectively communicating with opposite ends of the first cavity, end portions of the pigtail means and lead wire means respectively extending into the second and third cavities for attachment therein to opposite ends of the choke coil, said first and second and third cavities facing away from the conductive motor housing and brushes such that said holding part provides insulative shielding between the choke coil and the conductive motor housing.

2. The pump of claim 1, wherein said cavities face downwardly such that the choke coil is exposed only to the insulative bracket.

3. The pump of claim 1, further including through-holes formed in the holding part through which the pigtail means and lead wire means extend for location of their ends in the second and third cavities, respectively.

4. The pump of claim 3, wherein the ends of the pigtails and lead wires are press-fitted in the through-holes.

5. The pump of claim 1, further including link terminal board means embedded in the second and third cavities for receiving ends of the lead wires and pigtails in press-fitting engagement therewith.

6. The pump of claim 2, wherein said first and second and third cavities face the upper surface of the insulative bracket.

7. The pump of claim 6, wherein said holding part is fixed to the upper surface of the bracket.

8. In an electric fuel pump including a motor housing of conductive material, a motor in the housing, a bracket of insulating material and a pump cover defining a pump chamber in the housing, said pump cover including a fuel suction port and said motor housing having a fuel outlet port, an impeller mounted on a motor shaft of the motor, a commutator and brushes thereon mounted on a shaft, a choke coil, a pigtail connecting the brushes to one end of the choke coil and lead wires extending into the housing for connection to the other end of the choke coil, the improvement comprising a holding part formed of insulating material mounted to the bracket and including a first cavity receiving the choke coil, a second cavity and a third cavity respectively communicating with opposite ends of the first cavity, end portions of the pigtail and the lead wire respectively extending in the second and third cavities for attachment therein to opposite ends of the choke coil, said first and second and third cavities each being open in a common direction.

9. The housing of claim 1, wherein said first and second and third cavities provide substantially complete insulative shielding between the conductive motor housing and the choke coil.

* * * * *